United States Patent [19]
Leonard

[11] Patent Number: 5,738,798
[45] Date of Patent: Apr. 14, 1998

[54] METHOD FOR FABRICATING TAPERED EDGES ON INTEGRATED OPTOELECTRONIC DEVICES

[75] Inventor: Jerry Leonard, Plano, Tex.

[73] Assignee: Texas Instruments Incorporated, Dallas, Tex.

[21] Appl. No.: 376,981

[22] Filed: Jan. 23, 1995

[51] Int. Cl.$^6$ ................................................. G02B 6/25
[52] U.S. Cl. ........................... 216/24; 216/26; 216/48; 430/321
[58] Field of Search ................. 430/321; 216/24, 216/48, 26; 385/14, 43, 49

[56] References Cited

U.S. PATENT DOCUMENTS

| | | | |
|---|---|---|---|
| 4,671,609 | 6/1987 | Khoe et al. | 385/43 |
| 4,795,722 | 1/1989 | Welch et al. | 437/192 |
| 5,402,511 | 3/1995 | Malone et al. | 385/43 |
| 5,435,887 | 7/1995 | Rothschild et al. | 216/26 |
| 5,439,782 | 8/1995 | Haemmerle et al. | 430/321 |

OTHER PUBLICATIONS

Naoaki Yamaguchi & Yasuo Kokubun, "Low–Loss Spot Size Transformer by Dual Tapered Waveguides (DTW–SST)", Journal of Light Wave Technology, Apr. 4, 1990, pp. 587–593.

N. Yamaguchi, Y. Kokubun, "Spot Size Convertor By Overlapping Of Two Tapered Waveguides", Electronic Letters, Jan. 19, 1989, vol. 25 No. 2, pp. 128–130.

J.T. Boyd, C.M. Chuang, & C.L. Chen, "Fabrication of Optical Waveguide Taper Couplers Utilizing $SiO_2$", Applied Optics, Feb. 15, 1979, pp. 506–509.

Brinker and Scherer, "Sol–Gel Science: The Physics and Chemistry of Sol–Gel Processing", 1990, pp. 413–420.

Y.P. Joshi, "Shape of a Liquid Surface in Contact with a Solid", Eur. J. Phys., Aug. 1990, pp. 125–129.

Dietrich Marcuse, "Light Transmission Optics", 1982 Second Edition, pp. —10.

Primary Examiner—John A. McPherson
Attorney, Agent, or Firm—Bret J. Petersen; James C. Kesterson; Richard L. Donaldson

[57] ABSTRACT

A method for etching a tapered edge on a cladding layer 10 of an integrated optical waveguide by simultaneously etching a cured droplet of photoresist 16 and the core cladding material to translate the profile of the droplet to the cladding to provide a larger cladding thickness at the interface to the optical fiber 20 and a taper to the cladding thickness needed to control the performance of the integrated optic device. Advantages include selective thinning of the core cladding while maintaining a low loss coupling of the optical fiber to the waveguide core on the integrated device, and higher yield in production during edge polishing.

2 Claims, 1 Drawing Sheet

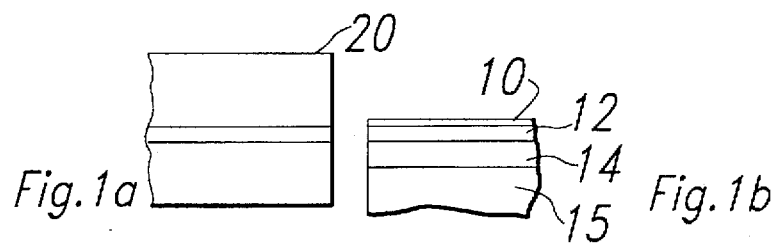
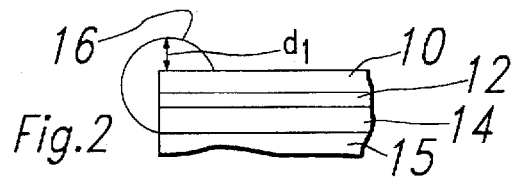
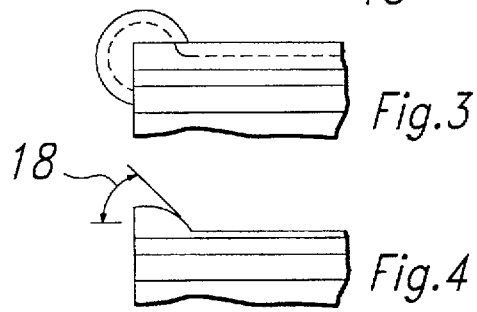
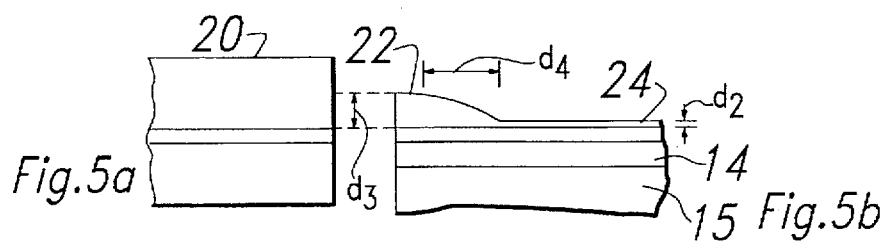
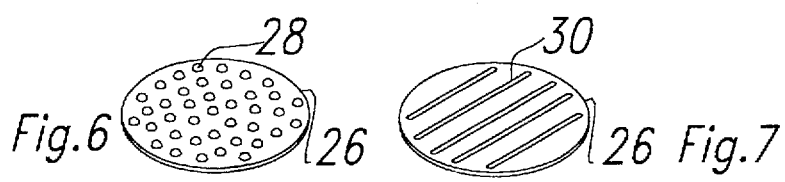
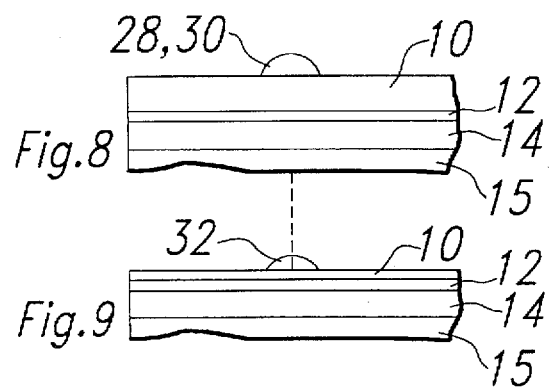

METHOD FOR FABRICATING TAPERED EDGES ON INTEGRATED OPTOELECTRONIC DEVICES

BACKGROUND OF THE INVENTION

The invention relates to integrated optic devices, circuits, and waveguides, and more particularly, to fabrication of a tapered cladding layer on the core of an integrated optic circuit which may then be connected to an optical fiber.

Optical data systems carry information over cables which are commonly known as fiber optic cables. In optical data systems it is often necessary to connect the fiber optic cable to an integrated circuit which will use the information on the fiber optic cable. The connection of the integrated optic devices to the fiber optic cables typically require a method of passing the optical signal from optical fiber to an optical waveguide on the integrated optical device. The light signal traveling through the core of the optical fiber is coupled to the core or optical waveguide of the integrated device. It is desirable to minimize the signal loss at the coupling of the optical fiber to the core of the integrated device.

The benefit of using a taper in an optical waveguide to reduce signal loss is generally known in the art. For example, Marcuse, Light Transmission Optics, Second Ed., Van Nostrand Reinhold Company, (1982) p. 405–407, teaches that the loss in a tapered optical waveguide is predominantly influenced by the length of the taper rather than by the shape of the taper.

It is also known in the art various ways to make a taper in an integrated circuit structure. The most common methods are undercut etching and shadow mask sputtering. Undercut etching, described by Boyd, et al, Fabrication of optical waveguide taper couplers utilizing $SiO_2$, Vol. 18, No. 4 APPLIED OPTICS 506 (1979), forms a taper with a very short or an abrupt change and thus has a higher loss due to mode mismatch. Another option for making a taper, shadow mask sputtering, described by Yamaguchi, et al, Low-Loss Spot-Size Transformer by Dual Tapered Waveguides (DTW-SST), 8 Journal of Lightwave Tech. 4 (1990), is capable of taper lengths near 4 mm. However, this method uses a sophisticated multistep process which is more costly.

SUMMARY OF THE INVENTION

The present invention introduces a method for etching a tapered edge on a cladding layer of an integrated optical waveguide by simultaneously etching a droplet of photoresist and the core cladding material to translate the profile of the droplet to the cladding. This provides a larger matching cladding thickness at the interface of the optical fiber and the integrated circuit followed by a taper in the cladding down to the cladding thickness needed to control the performance of the integrated optic device.

The present invention provides technical advantages including low loss coupling of the optical fiber to the wave guide core on the integrated device, and higher yield in production during edge polishing due to the protection the thicker cladding provides the waveguide dielectric core. The present invention for fabricating a taper in an integrated optic cladding layer reduces loss to the optic signal by using a simplified method to form a long taper, whereby the length of the taper is determined by the meniscus of the liquid photoresist on the substrate.

The method of the present invention includes a method for etching a tapered edge on a cladding layer of an integrated optical waveguide by applying a curable liquid to a layer of cladding with the liquid forming a taper, curing the liquid, and then simultaneously etching the curable liquid and the cladding.

The simultaneous etch process is commonly known as etchback. It is normally used to planarize the topology of an integrated circuit surface. This is done by spinning on liquid photoresist which will tend to settle in low spots of an integrated circuit surface. The circuit is then subjected to an etch that will simultaneously etch the photoresist and the top layer on the circuit, typically oxide, that is to be flattened or planarized. In contrast, the method of the current invention uses this process to transfer a topology rather than to planarize the circuit topology and uses a droplet rather than a thin coat of photoresist that is spun on the surface. This is apparently the first time a tapered edge on a cladding layer of an integrated optical waveguide has been fabricated by simultaneously etching a droplet of photoresist and the core cladding material to translate the profile of the droplet to the cladding

BRIEF DESCRIPTION OF THE DRAWINGS

FIGS. 1a, b shows a fiber optic cable 1a aligned with a waveguide in an integrated optic device 1b.

FIG. 2 illustrates a droplet of photoresist applied on the integrated optic device.

FIG. 3 illustrates the simultaneous etching of the photoresist droplet and cladding.

FIG. 4 identifies the location of the taper angle.

FIGS. 5a and 5b show the cross sectional view of the coupling of the optic fiber 5a to the integrated optic device 5b.

FIG. 6 shows an embodiment where the droplets are placed on a wafer.

FIG. 7 illustrates an embodiment where the meniscus of a ridge of liquid on a wafer is used to create the desired taper for a plurality of integrated circuits on a wafer.

FIG. 8 is a cross-sectional view of a liquid meniscus formed by the droplets of FIG. 6 or the ridge of FIG. 7.

FIG. 9 is a cross-sectional view after etching the taper into the cladding layer, and illustrates how the droplet or ridge may form a taper for multiple circuits which are then separated.

DESCRIPTION OF THE PREFERRED EMBODIMENTS

The preferred embodiment of the present invention is best understood by referring to FIGS. 1–9 of the drawings, like numerals are used for like and corresponding parts of the various drawings.

Optical coupling of integrated circuits to a fiber may be initially made without a taper in the cladding layer as shown in FIGS. 1a, 1b. The upper cladding 10 covers the core 12 which carries the optical signal. The lower cladding 14 is typically $SiO_2$ on a silicon substrate 15. Here, the thickness of the upper cladding layer 10 is determined by what thickness is needed for optoelectronic devices in the circuit, and not by the thickness needed insure a mode match at the coupling of the optical fiber 20 to the integrated optic device. If used in this form, the necessary result of this configuration is increased loss in the optical signal.

It is desirable to provide a larger cladding thickness at the interface of the optical fiber and the integrated circuit to prevent mismatch loss to the optical signal, and also have a smaller cladding thickness over the remainder of the circuit.

The smaller cladding thickness is needed to allow control of the optic signal such as with optical switches. The present invention teaches an economically feasible method to obtain such a result.

FIG. 2 shows the step of forming a taper using a first embodiment of the present invention. A circuit substrate 15 is provided with a lower cladding layer 14 and a core layer 12. An upper cladding layer 10 is then added with sufficient thickness to couple to an optical fiber. A curable liquid 16, typically photoresist, is applied over the region where the taper is to be formed.

After the photoresist 16 has cured, the taper is formed as shown in FIG. 3 by simultaneously etching both the photoresist 16 and the upper cladding layer 10. The dashed line indicates the progress of the etching process. Photoresist, and etch characteristics are chosen to obtain the desired etch rate ratio. One preferred embodiment uses photoresist and etch to obtain a fairly equal etch rate that will transfer the taper from the photoresist to the cladding.

The simultaneous etch process is commonly known as etchback. It is normally used to planarize the topology of the chip surface (See eg. U.S. Pat. No. 4,795,722 assigned to Texas Instruments inc.). This is typically done by spinning on liquid photoresist over the surface of the chip or wafer. The photoresist will tend to settle thicker in low spots than in high spots. The chip is then subjected to an etch that will simultaneously etch the photoresist and the top layer on the chip that is to be flattened or planarized. In contrast, the method of the current invention uses this process to transfer a structure rather than to planarize the chip topology and uses a droplet rather than a thin coat of photoresist that is spun on the surface. This is apparently the first time a tapered edge on a cladding layer of an integrated optical waveguide has be fabricated by simultaneously etching a droplet of photoresist and the core cladding material to translate the profile of the droplet to the cladding.

The liquid solid contact angle, or taper angle 18 is shown in FIG. 4. This angle is a function of the surface tensions at the interface of the liquid photoresist 16 and the cladding surface 10 (see, eg. *Young's Equation*, Brinker and Scherer, Sol-Gel Science: The Physics and chemistry of Sol-Gel Processing, (1990), 413–415; and Joshi, Shape of a liquid surface in contact with a solid, Eur. J. Physics, 11 (1990) 125–126). The properties predominantly affecting the surface tension include the vapor pressure of the liquid photoresist 16 and the roughness and impurities in the cladding surface 14. Shrinkage during curing of the liquid photoresist may also affect the contact angle. Favorable results were obtained using positive Novolak resin photoresist on a $SiO_2$ cladding, applied with a brush or pointed instrument giving a taper length of 1 to 5 mm. The photoresist is then bake cured prior to etching.

FIG. 5 illustrates an optical fiber 20 in relationship to the completed cladding taper 22 on the integrated optic device 24. Distance d2 is the thickness of the remaining cladding over the circuit generally, while distance d3 is the thickness of the taper at the fiber coupling. Distance d1 shown in FIG. 2 is the thickness of the photoresist applied on the cladding surface. Distance d1 is usually chosen to be greater than d3 plus d2 to insure a d3 will be a maximum at the intersection with the optical fiber, assuming photoresist and cladding are chosen with equal etch rates. Note that the vertical and horizontal dimensions of FIG. 5 are not drawn to the same scale. Distance d3 is preferably between 3 um and 20 um (and most preferably between 10 um and 20 um) while distance d4 is preferably between 1 to 5 mm (and most preferably greater than 5 mm).

Additional embodiments of the present invention involve the fabrication of tapered cladding for a plurality of integrated optic devices simultaneously, such as on a wafer. FIG. 6 illustrates the curable liquid, or photoresist, applied to the substrate, a wafer 26 as droplets 28. FIG. 7 shows the embodiment where the photoresist is applied as a ridge 30 on the wafer substrate 26. FIG. 8 represents a cross-sectional view of ether the droplets 28 or the ridges 30 of FIGS. 7 and 8. FIG. 9 shows the cross sectional view of FIG. 8 after processing. The raised cladding region 32 of FIG. 9 could be cut at the central axis resulting in two tapers, one for an integrated optic device on either side of the raised area 32.

The preferred embodiments may be varied in many ways while retaining the features of the cladding taper on an integrated optic device which is the object of this invention. For example, other cladding materials and other curable liquids could be used to obtain the taper profile. Also, other materials and methods could be used to etch the profile into the cladding layer. In addition, other combinations of distances d1, d2 and d3 could be obtained with the use of different curable liquids and various etching processes.

Items as called out in the drawings with some of their alternative embodiment are listed in the sole table below.

TABLE 1

| Element | Specific Embodiment | Generic Name |
|---|---|---|
| 10/14 | $SiO_2$ (undoped) | Cladding |
| 12 | $SiO_2$ (doped) | Core |
| 16 | Photoresist | Curable Liquid |
| 18 | Taper Angle | Liquid/Solid contact angle |
| 20 | Optical Fiber | Optical Fiber |
| 22 | Tapered $SiO_2$ | Cladding Taper |
| 24 | $SiO_2$ | Reduced Thickness Cladding |
| 26 | Silicon Wafer | Wafer/Substrate |
| 28 | Droplets | Curable Liquid |
| 30 | Ridge | Curable Liquid |
| 32 | Tapered $SiO_2$ | Tapered Cladding |

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for etching a tapered edge on a cladding layer of an integrated optical waveguide, said process comprising:
   a. applying a layer of said cladding to a substrate;
   b. applying a curable liquid as a droplet on the edge of said cladding layer and said substrate with the liquid forming a taper;
   c. curing the curable liquid; and
   d. simultaneously etching said curable liquid and said cladding to replicate the taper of the curable liquid into the cladding.

2. The method of claim 1, wherein:
   said curable liquid comprises photoresist.

\* \* \* \* \*